United States Patent
Narumi (10) Patent No.: US 11,580,624 B2
(45) Date of Patent: Feb. 14, 2023

(54) IMAGE PROCESSING SYSTEM, IMAGE PROCESSING APPARATUS, AND NON-TRANSITORY COMPUTER READABLE MEDIUM

(71) Applicant: FUJIFILM BUSINESS INNOVATION CORP., Tokyo (JP)

(72) Inventor: Shota Narumi, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 233 days.

(21) Appl. No.: 16/991,296

(22) Filed: Aug. 12, 2020

(65) Prior Publication Data

US 2021/0304373 A1    Sep. 30, 2021

(30) Foreign Application Priority Data

Mar. 26, 2020 (JP) .............................. JP2020-055293

(51) Int. Cl.
G06T 5/00     (2006.01)
G06T 5/50     (2006.01)

(52) U.S. Cl.
CPC ............... G06T 5/008 (2013.01); G06T 5/50 (2013.01)

(58) Field of Classification Search
CPC . G06T 5/008; G06T 5/50; G06T 2207/10024; G06T 5/40; G06T 5/009; H04N 1/407; H04N 1/46; H04N 1/6027
USPC ....................................................... 382/274
See application file for complete search history.

(56) References Cited

U.S. PATENT DOCUMENTS 9,589,338 B2    3/2017 Yamamoto
2016/0275660 A1*    9/2016 Yamamoto ................ G06T 7/97

FOREIGN PATENT DOCUMENTS

JP    2016-177500 A    10/2016
WO    WO-2014206394 A2 *    12/2014    ............. G06T 5/002

* cited by examiner

*Primary Examiner* — Amandeep Saini
(74) *Attorney, Agent, or Firm* — Oliff PLC (57) ABSTRACT

An image processing apparatus includes a processor configured to extract a component related to luminance of each of a sample image and a processing target image that is to undergo image processing to match an impression of the processing target image to the sample image, extract feature values of the processing target image and the sample image by attaching to a pixel value of each pixel forming the processing target image and the sample image a weight responsive to the component related to the luminance, and make adjustment to match the feature value of the processing target image to the feature value of the sample image.

14 Claims, 9 Drawing Sheets

IMAGE PROCESSING SYSTEM, IMAGE PROCESSING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-055293 filed Mar. 26, 2020.

BACKGROUND

(i) Technical Field

The present disclosure relates to an image processing system, an image processing apparatus, and a non-transitory computer readable medium.

(ii) Related Art

With digital cameras in widespread use, more and more users have been capturing and viewing digital images. As smart phones and tablets have been widely used, there are increasing needs for users to operate more intuitively the devices in image quality adjustment using image edit applications on personal computers (PCs) to obtain desired images.

The image quality adjustments of digital images include adjusting component values of chromaticity, luminance, hue, saturation in RGB, CIEL*a*b, HSV color spaces and contrasts of the component values. In these adjustments, a user may specify a sample image serving as a sample among the digital images and perform image processing to match the image quality of an entire unprocessed image to the image quality of the sample image. In this way, the image processing is performed to match the impression of the processing target image to the impression of the sample image.

Japanese Unexamined Patent Application Publication No. 2016-177500 discloses an image processing apparatus. The image processing apparatus includes a color converter, feature value extractor, chromaticity component adjuster, and luminance component adjuster. The color converter acquires a chromaticity component and luminance component of a sample image and a processing target image that is to undergo image processing to match the impression there of to the sample image. The feature value extractor extracts feature values of the chromaticity component and luminance component of the processing target image and sample image. The chromaticity component adjuster makes adjustment to match the chromaticity component of the processing target image to the chromaticity component of the sample image using the feature value of the chromaticity component. The luminance component adjuster makes adjustment to match the luminance component of the processing target image to the luminance component of the sample image in a non-dark region other than a dark region using the feature value of the luminance component and sets an amount of adjustment to be smaller in the dark region than an amount of adjustment applied when the adjustment is performed in the non-dark region.

If dark pixels are too many in the processing target image, an image-processed image may become unnatural.

SUMMARY

Aspects of non-limiting embodiments of the present disclosure relate to providing an image processing apparatus that reduces a possibility that a processing target image subsequent to image processing becomes unnatural when the image processing to match the image quality of the processing target image to the image quality of the sample image is performed.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image processing apparatus. The image processing apparatus includes a processor configured to extract a component related to luminance of each of a sample image and a processing target image that is to undergo image processing to match an impression of the processing target image to the sample image, extract feature values of the processing target image and the sample image by attaching to a pixel value of each pixel forming the processing target image and the sample image a weight responsive to the component related to the luminance, and make adjustment to match the feature value of the processing target image to the feature value of the sample image.

BRIEF DESCRIPTION OF THE DRAWINGS

Exemplary embodiments of the present disclosure will be described in detail based on the following figures, wherein.

DETAILED DESCRIPTION

Exemplary embodiments of the disclosure are described with reference to the drawings.

Image Processing System

Figure 1:
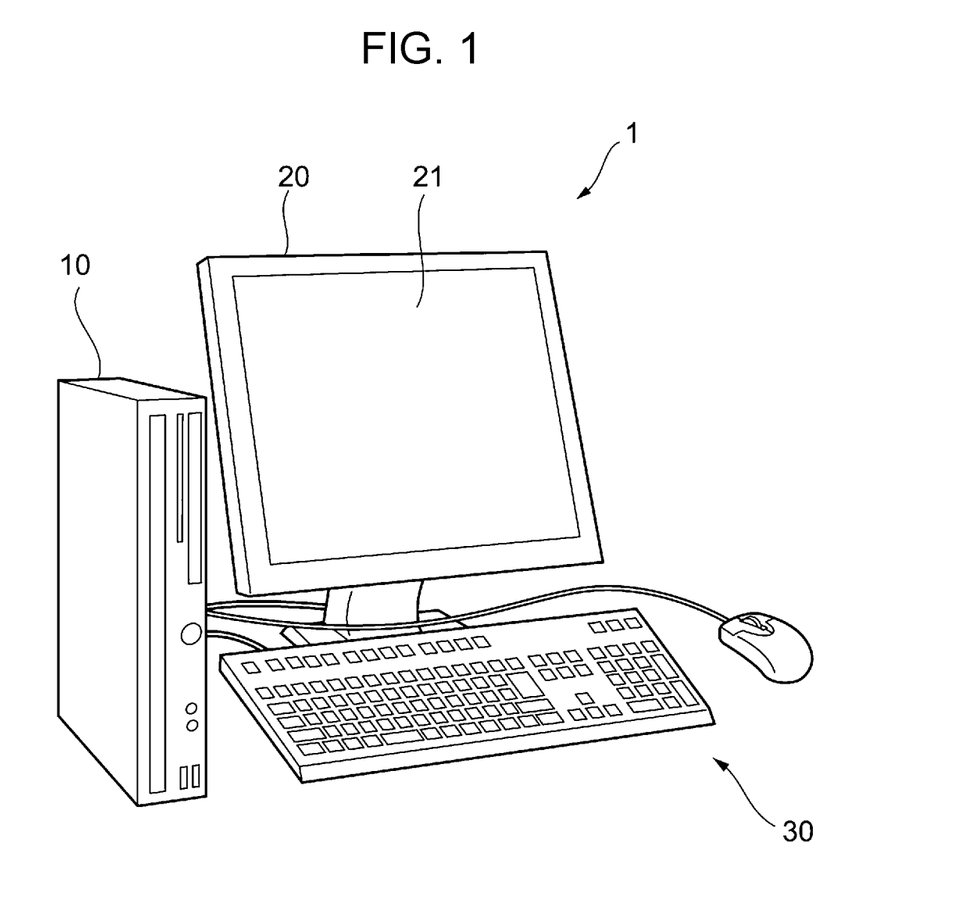
FIG. 1 illustrates a configuration of an image processing system of exemplary embodiments.

FIG. 1 illustrates a configuration of an image processing system 1 of exemplary embodiments. As illustrated in FIG. 1, the image processing system 1 includes an image processing apparatus 10, display 20, and input apparatus 30. The image processing apparatus 10 performs image processing on image information on an image displayed on the display 20. The display 20 receives the image information created by the image processing apparatus 10 and displays an image in accordance with the image information. The input apparatus 30 is used to receive a variety of information a user inputs on the image processing apparatus 10.

The image processing apparatus 10 is a general-purpose personal computer (PC). The image processing apparatus 10, under the control of an operating system (OS), operates a variety of software applications, thus creating image information.

The image processing apparatus 10 includes a central processing unit (CPU), memory, and storage, such as a hard disk drive (HDD) or solid-state drive (SSD). The CPU is a kind of processor and executes OS and software applications. The memory stores data used to execute a variety of software applications and the storage stores data input to the software applications and data output from the software applications.

The image processing apparatus 10 further includes a communication interface (hereinafter referred to as a communication I/F) used to communicate with external devices, and input devices including a keyboard, mouse, touch panel and/or stylus pen.

The display 20 displays an image on a display screen 21. The display 20 displays the image in additive mixture of color and may be a liquid-crystal display for PC, liquid-crystal television or projector. The display 20 is not limited to liquid-crystal type. Referring to FIG. 1, the display screen 21 is arranged on the display 20. If a projector is used for the display 20, the display screen 21 is a screen arranged external to the display 20.

The input apparatus 30 includes a keyboard and mouse. The input apparatus 30 starts up or ends a software application for image processing. The input apparatus 30 is also used to enter an instruction for the image processing apparatus 10 to perform the image processing.

The image processing apparatus 10 is connected to the display 20 via a digital visual interface (DVI). The image processing apparatus 10 and display 20 may also be connected to each other via high-definition multimedia interface (HDMI (registered trademark)) or DisplayPort.

The image processing apparatus 10 is connected to the input apparatus 30 via a universal serial bus (USB). The image processing apparatus 10 and the input apparatus 30 may also be connected to each other via IEEE1394 or RS-232C interface.

According to the exemplary embodiments, the image processing is performed as described in detail below. In the image processing, the image quality of a processing target image is matched the image quality of a sample image. In this way, the impression of the processing target image is matched to the impression of the sample image.

The display 20 in the image processing system 1 first displays a sample image and a processing target image that is an image prior to the image processing. When a user gives to the image processing apparatus 10 an instruction to perform the image processing using the input apparatus 30, the image processing apparatus 10 performs the image processing on image information on the processing target image. The results of the image processing are reflected on an image displayed on the display 20. The processing target image having undergone the image processing is thus drawn and displayed on the display 20. In this case, while viewing the display 20, the user may perform an image processing operation interactively in a more intuitive and easier way.

The image processing system 1 of the exemplary embodiments is not limited to the configuration in FIG. 1. For example, the image processing system 1 may be a tablet terminal. The tablet terminal may include a touch panel. The touch panel may display an image and receive an instruction from the user. In other words, the touch panel functions as the display 20 and input apparatus 30. Similarly, a touch monitor may be used as an apparatus into which the display 20 and input apparatus 30 are integrated. In this case, the touch panel is used as the display screen 21 in the display 20. The image processing apparatus 10 creates image information and displays an image on the touch monitor in accordance with the image information. The user may enter an instruction for the image processing by touching the touch monitor.

Figure 2A:
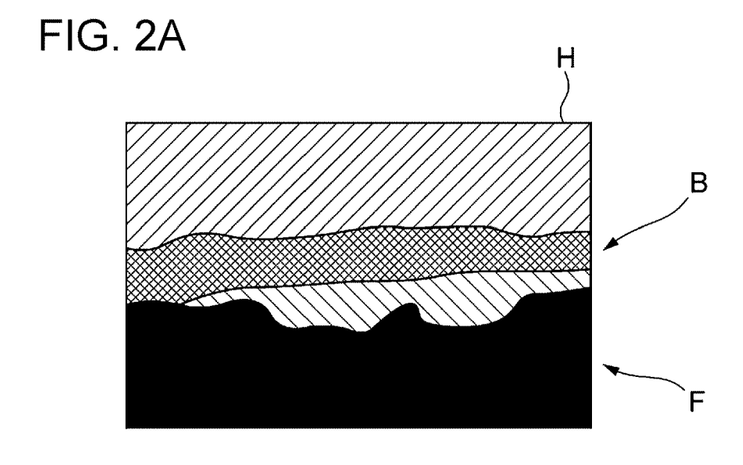
FIGS. 2A through 2C illustrate a first example of a related art technique of image processing in which the image quality of a processing target image is matched to the image quality of a sample image.
Figure 2B:
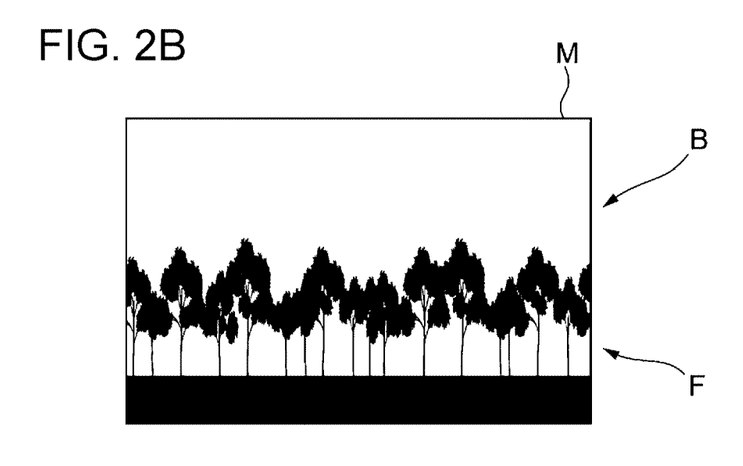
Figure 2C:
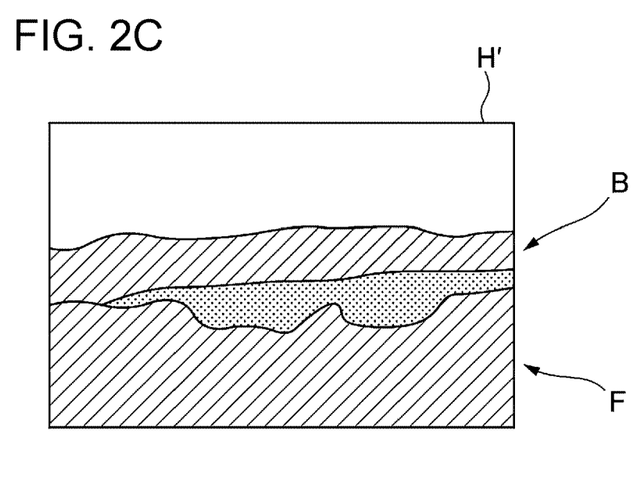

FIGS. 2A through 2C illustrate a first example of a related art technique of image processing in which the image quality of a processing target image is matched to the image quality of a sample image.

FIG. 2A illustrates a processing target image H prior to image processing and FIG. 2B illustrates a sample image M. In the exemplary embodiments, the "unprocessed image" serves as a target for image processing and the "sample image" gives an impression desired by a user and serves as a sample that is used to perform image processing to match the image quality of the processing target image H to the image quality of the sample image M.

The processing target image H and sample image M are displayed on the display 20, such as a liquid-crystal panel or liquid-crystal display. The image processing is performed when an image-editing software application running on a tablet, smart phone, or personal computer (PC) processes image information. While the image-editing software application is running, the user performs image processing by operating a menu or the like displayed together with the processing target image H and sample image M on the display 20. In the case of the tablet or smart phone, the user performs image processing by touching a liquid-crystal panel serving as a touch panel with the user's finger or a touch pen. In the case of PC, the user performs image processing using a keyboard or mouse connected to the PC.

The processing target image H and sample image M illustrated include a foreground F as a close-view image and a background image B as a distant-view image. The foreground F and background image B of the processing target image H includes a dark area having a lower lightness. Specifically, the processing target image H is a darker image as a whole. On the other hand, in the sample image M, the foreground F is a dark area having a lower lightness while the background image B is a bright non-dark area. The sample image M is a brighter image as a whole.

The user may now wish to modify the processing target image H to an image having the same impression of the sample image M by performing the image processing on the processing target image H. For example, if the background image B of the sample image M is a red sky image and the background image B of the processing target image H is a blue-sky image, the user may now wish to modify the background image B of the processing target image H to a red sky image.

FIG. 2C illustrates the image-processed image H' through related art technique.

Since the sample image M is brighter than the processing target image H as a whole, the foreground F originally supposed to be a dark area is too high in luminance in the image-processed image H'. The image-processed image H' is likely to be unnatural. Such image processing is typical of related art image-editing software applications. For example, such image processing is performed in Adobe Photoshop manufactured by Adobe Systems Incorporated.

Figure 3A:
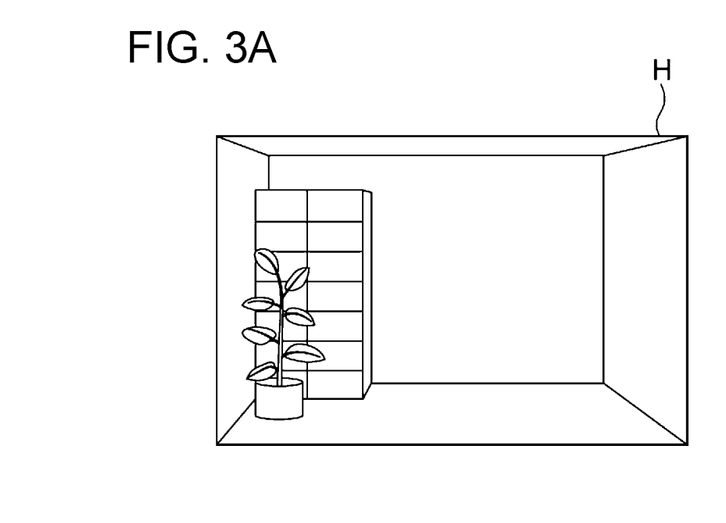
FIGS. 3A through 3D illustrate a second example of the related art technique of image processing in which the image quality of the processing target image is matched to the image quality of the sample image.
Figure 3B:
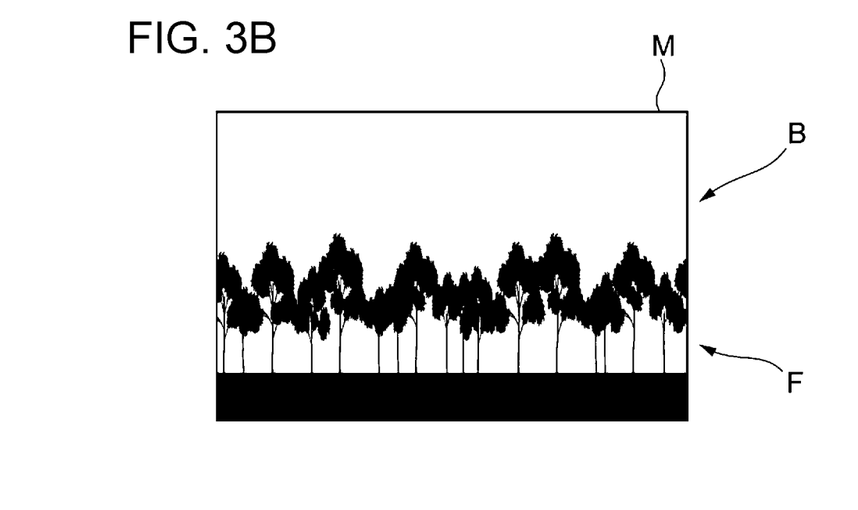

FIGS. 3A through 3D illustrate a second example of the related art technique of image processing in which the image quality of the processing target image is matched to the image quality of the sample image. FIG. 3A illustrates the processing target image H before being image processed and FIG. 3B illustrates the sample image M.

The processing target image H in FIG. 3A is an indoor room image. The sample image M in FIG. 3B is identical to the sample image M in FIG. 2B and includes the foreground F as a close-view image and the background image B as a distant-view image.

The user may now wish to modify the processing target image H to an image having the impression of the sample image M by performing the image processing on the processing target image H.

Figure 3C:
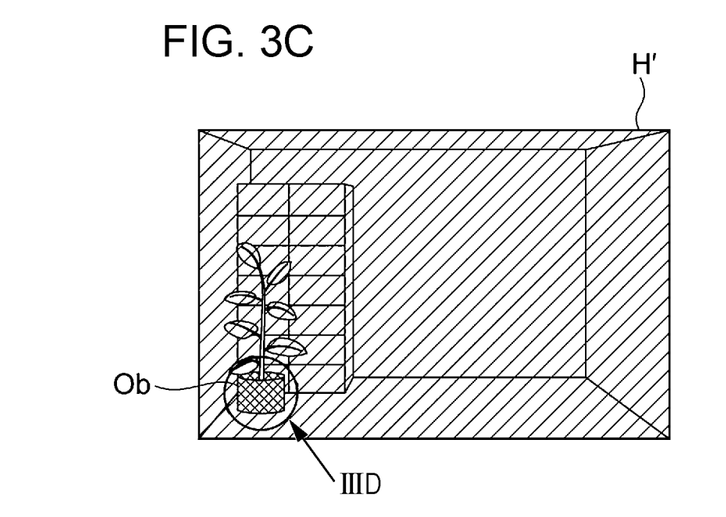

FIG. 3C illustrates the image H' image processed via the related art technique.

Figure 3D:
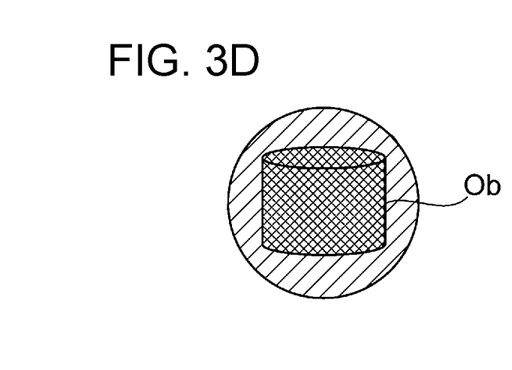

In comparison with the processing target image H before being image processed, the sample image M has a large variation in lightness because of a large lightness difference between the foreground F and the background image B. This means that the standard deviation of the luminance components of the pixel values of the pixels forming the image is larger. Because of this, in the image-processed image H', an object Ob looks shining brightly as illustrated in FIGS. 3C and 3D, leading to a defect.

As described above, if the processing target image H and sample image M have many dark areas and thus dark pixels, the image-processed image H' becomes unnatural, possibly leading to a defect, such as noise, halation, or light source color. Specifically, if the processing target image H has a larger dark area and thus more dark pixels as in FIG. 2A, the mean of the pixel values of the pixels forming the image becomes smaller. If the foreground F of the sample image M has a dark area and thus dark pixels as illustrated in FIG. 3B, the standard deviation of the pixel values may possibly be larger. In this way, the image-processed image H' becomes unnatural, possibly leading to a defect.

According to the exemplary embodiments, the image processing described below is performed, causing the image-processed image H' to be looked more natural. The image processing apparatus 10 for the image processing is described below.

Configuration of Image Processing Apparatus

First Exemplary Embodiment

A first exemplary embodiment is described below. According to the first exemplary embodiment, feature values of the processing target image H and sample image M are extracted. The feature value is calculated using as a weight W a luminance value of each pixel. If the feature value of the processing target image H is matched to the feature value of the sample image M, the image processing to set the impression of the image-processed image H' to the impression of the sample image M is thus performed.

Figure 4:
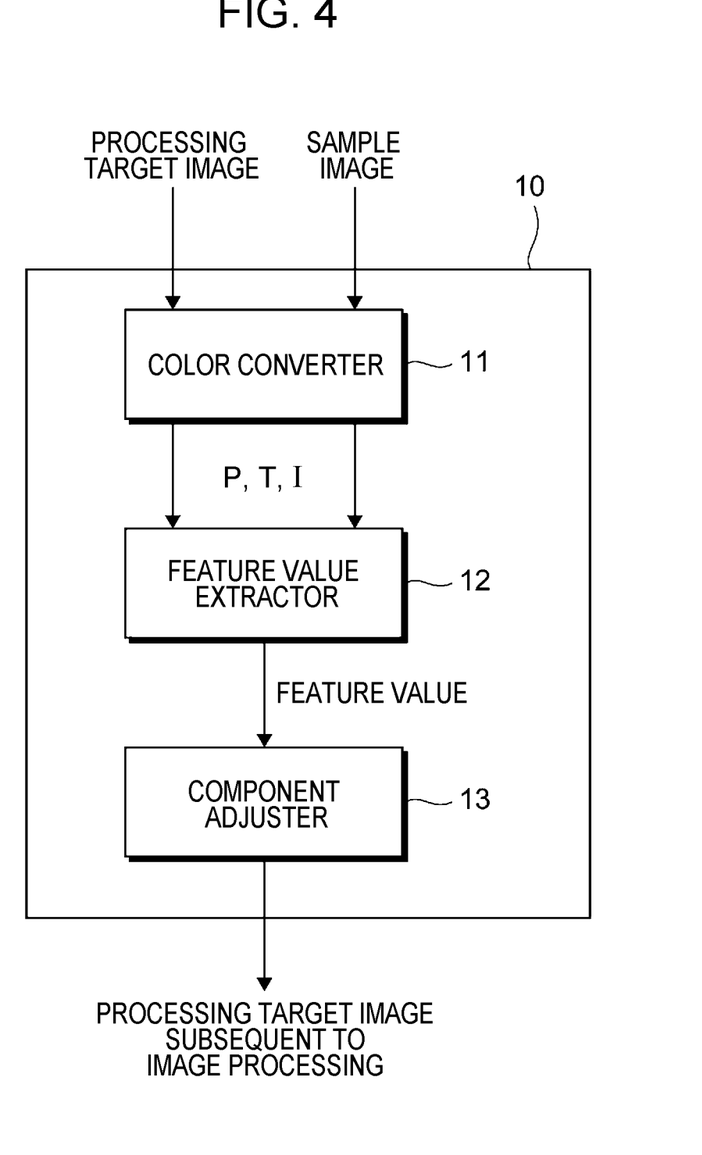
FIG. 4 is a functional block diagram illustrating an image processing apparatus of a first exemplary embodiment.

FIG. 4 is a functional block diagram illustrating the image processing apparatus 10 of the first exemplary embodiment. Referring to FIG. 4, the image processing apparatus 10 includes a color converter 11, feature value extractor 12, and component adjuster 13. The color converter 11 acquires image information (input image data) of the processing target image H and sample image M and converts the image information into a chromaticity component and a luminance component. The feature value extractor 12 extracts a feature value from the converted image information. The component adjuster 13 performs an operation to match the feature value of the processing target image H to the feature value of the sample image M.

The color converter 11 performs a color conversion operation on the image information that is used to display the processing target image H and sample image M on the display 20. The image information is video data (red, green, and blue (RGB) data). The RGB data is converted into IPT data. Specifically, chromaticity in an RGB color space is converted into chromaticity in an IPT color space. The IPT color space is a rectangular coordinate color space defined by three components of lightness (I), chromaticity in red-green direction (P), and chromaticity in yellow-blue direction (T). In the exemplary embodiments, P represents a chromaticity component in the red-green direction, T represents a chromaticity component in the yellow-blue direction, and I represents a luminance component of the lightness. The color conversion by the color converter 11 may be considered as extracting the chromaticity components P and T and luminance component I from the processing target image H and sample image M.

The feature value extractor 12 extracts the feature values of the chromaticity components P and T and luminance component I of the processing target image H and sample image M. The feature value is an index that determines the impression of an image when the user views the image. According to the first exemplary embodiment, the mean and dispersion of the pixel values of the pixels forming the processing target image H and sample image M are calculated as the feature values. The pixel value includes the chromaticity components P and T and luminance component I. The feature value is thus calculated from each of the chromaticity components P and T and luminance component I. According to the first exemplary embodiment, the mean is an arithmetic mean and the dispersion is a standard deviation.

Specifically, the feature value extractor 12 calculates the arithmetic mean of the chromaticity components P and T and luminance components I of the pixels forming each of the processing target image H and sample image M. The feature value extractor 12 further calculates the standard deviations of the chromaticity components P and T and luminance components I of the pixels forming each of the processing target image H and sample image M. According to the first exemplary embodiment, the feature value extractor 12 uses the luminance component I as a weight W, thus determining the arithmetic mean and standard deviation.

According to the first exemplary embodiment, the weight W is defined by equations (1). In equations (1), wt(i,j) represents a weight W at a position (i,j) of each pixel forming the processing target image H and It(i,j) represents a luminance component I at the position (i,j) of each pixel forming the processing target image H. Wr(i,j) represents a weight W at the position (i,j) of each pixel forming the sample image M and Ir(i,j) represents a luminance component I at the position (i,j) of each pixel forming the sample image M. According equations (1), the luminance components I, as they are, are weights W of the processing target image H and sample image M.

$$Wt(i,j) = It(i,j)$$

$$Wr(i,j) = Ir(i,j) \qquad (1)$$

Since the arithmetic mean is calculated from each set of the chromaticity components P and T and luminance component I of each of the processing target image H and sample image M, six arithmetic means result. The six arithmetic means are calculated according to equations (2).

In equations (2), $P_{i,j}$ is a P value at the position (i,j) of each pixel forming the processing target image H and sample image M. $T_{i,j}$ is a T value at the position (i,j) of each pixel forming the processing target image H and sample image M. $I_{i,j}$ is an I value at the position (i,j) of each pixel forming the processing target image H and sample image M.

In equations (2), $\mu_{Pt}$ is the arithmetic mean of the P values of the processing target image H. $\mu_{Tt}$ is the arithmetic mean of the T values of the processing target image H. $\mu_{It}$ is the arithmetic mean of the I values of the processing target image H.

$\mu_{Pr}$ is the arithmetic mean of the P values of the sample image M. $\mu_{Tr}$ is the arithmetic mean of the T values of the sample image M. $\mu_{Ir}$ is the arithmetic mean of the I values of the sample image M.

$$\mu_{Pt} = \frac{\sum (Wt(i,j)) \times Pt(i,j)}{\sum Wt(i,j)}$$

$$\mu_{Tt} = \frac{\sum (Wt(i,j)) \times Tt(i,j)}{\sum Wt(i,j)}$$

$$\mu_{It} = \frac{\sum (Wt(i,j)) \times It(i,j)}{\sum Wt(i,j)}$$

$$\mu_{Pr} = \frac{\sum (Wt(i,j)) \times Pr(i,j)}{\sum Wt(i,j)}$$

$$\mu_{Tr} = \frac{\sum (Wt(i,j)) \times Tr(i,j)}{\sum Wt(i,j)}$$

$$\mu_{Ir} = \frac{\sum (Wt(i,j)) \times Ir(i,j)}{\sum Wt(i,j)} \quad (2)$$

Since the standard deviation is calculated from each set of the chromaticity components P and T and luminance component I of each of the processing target image H and sample image M, six standard deviations result. The standard deviations are calculated according to equations (3).

In equations (3), $P_{i,j}$, $T_{i,j}$, and $I_{i,j}$ are identical to those in equations (2). $\sigma_{Pt}$ is the standard deviation of the P values of the processing target image H. $\sigma_{Tt}$ is the standard deviation of the T values of the processing target image H. $\sigma_{It}$ is the standard deviation of the I values of the processing target image H.

$\sigma_{Pr}$ is the standard deviation of the P values of the sample image M. $\sigma_{Tr}$ is the standard deviation of the T values of the sample image M. $\sigma_{Ir}$ is the standard deviation of the I values of the sample image M.

$$\sigma_{Pt} = \sqrt{\frac{\sum (Wt(i,j) \times Pt(i,j) - \mu_{Pt})^2}{i \times j}}$$

$$\sigma_{Tt} = \sqrt{\frac{\sum (Wt(i,j) \times Tt(i,j) - \mu_{Tt})^2}{i \times j}}$$

$$\sigma_{It} = \sqrt{\frac{\sum (Wt(i,j) \times It(i,j) - \mu_{It})^2}{i \times j}}$$

$$\sigma_{Pr} = \sqrt{\frac{\sum (Wt(i,j) \times Pr(i,j) - \mu_{Pr})^2}{i \times j}}$$

$$\sigma_{Tr} = \sqrt{\frac{\sum (Wt(i,j) \times Tr(i,j) - \mu_{Tr})^2}{i \times j}}$$

$$\sigma_{Ir} = \sqrt{\frac{\sum (Wt(i,j) \times Ir(i,j) - \mu_{Ir})^2}{i \times j}} \quad (3)$$

In accordance with the pixel values of the pixels forming each image, the feature value extractor 12 weights the pixel values with the weights W based on the luminance components I and extracts the feature values of each of the processing target image H and sample image M. In this case, the feature values are the mean of the pixel values and the dispersion of the pixel values. The feature value extractor 12 calculates as the mean the arithmetic mean by weighting the pixel values of the pixels with the weights W and calculates as the dispersion the standard deviation by determining the arithmetic mean after weighting the pixel values of the pixels with the weights W.

For example, the pixel values of the pixels may be 10, 20, and 30 and the weights thereof may be 0.2, 0.4, and 0.6, respectively. In such a case, the weights 0.2, 0.4, and 0.6 are replaced with 2, 4, and 6, respectively. This replacement may be interpreted as meaning that there are a total of 12 pieces of data, namely, two of pixel value 10, four of pixel value 20, and six of pixel value 30. Specifically, data 10, 10, 20, 20, 20, 20, 30, 30, 30, 30, 30, and 30 are used to calculate the standard deviation in a standard calculation method.

Using the feature values extracted by the feature value extractor 12, the component adjuster 13 makes adjustment by matching the feature value of the processing target image H to the feature value of the sample image M.

In the adjustment operation, using the arithmetic means and the standard deviations of the processing target image H and sample image M, the component adjuster 13 approximates the arithmetic mean and standard deviation of the processing target image H to the arithmetic mean and standard deviation of the sample image M.

The adjustment operation is performed in accordance with equations (4) through (6).

Equation (4) is used to calculate the P value. Pt(i,j) is a P value at the position (i,j) forming the image of the processing target image H before being adjusted. Pt'(i,j) is a P value at the position (i,j) forming the image of the processing target image H after being adjusted.

Equation (5) is used to calculate the T value. Tt(i,j) is a T value at the position (i,j) forming the image of the processing target image H before being adjusted. Tt'(i,j) is a T value at the position (i,j) forming the image of the processing target image H after being adjusted.

Equation (6) is used to calculate the I value. It(i,j) is an I value at the position (i,j) forming the image of the processing target image H before being adjusted. It'(i,j) is an I value at the position (i,j) forming the image of the processing target image H after being adjusted.

$$P't(i,j) = Wt(i,j) \times \left[ (Pt(i,j) - \mu_{Pr}) \frac{\sigma_{Pr}}{\sigma_{Pt}} + \mu_{Pr} \right] - (1 - Wt(i,j)) \times Pt(i,j) \quad (4)$$

$$T't(i,j) = Wt(i,j) \times \left[ (Tt(i,j) - \mu_{Tr}) \frac{\sigma_{Tr}}{\sigma_{Tt}} + \mu_{Tr} \right] - (1 - Wt(i,j)) \times Tt(i,j) \quad (5)$$

$$I't(i,j) = Wt(i,j) \times \left[ (It(i,j) - \mu_{Ir}) \frac{\sigma_{Ir}}{\sigma_{It}} + \mu_{Ir} \right] - (1 - Wt(i,j)) \times It(i,j) \quad (6)$$

With respect to each pixel at the position (i,j) forming the image of the processing target image H, the chromaticity components P and T and luminance component I are adjusted to match the sample image M. Alpha blending is performed with the pixel value of each pixel forming the processing target image H weighted with a weight Wt(i,j) in accordance with equations (4) through (6). The feature value of the processing target image H is thus matched to the feature value of the sample image M. In other words, the feature value of the processing target image H is matched to the feature value of the sample image M in the adjustment operation by weighting the pixel value with the weight W based on the luminance component I.

The color converter 11 performs a reverse conversion to convert the IPT data back into the RGB data and displays on the display 20 the RGB data as the image-processed image H'.

As described above, the component adjuster 13 determines Pt'(i,j), Tt'(i,j), and It'(i,j) using the weight Wt(i,j). The weight Wt(i,j) may not necessarily be used. Such a process may be performed in accordance with equations (7) through (9):

$$P't(i, j) = (Pt(i, j) - \mu_{Pr})\frac{\sigma_{Pr}}{\sigma_{Pt}} + \mu_{Pr} \quad (7)$$

In equations (6) and (9), It'(i,j) as the luminance component I may fall outside the range of 0 to 1. In such a case, It'(i,j) may be normalized by setting the minimum value of It'(i,j) to 0 and the maximum value of It'(i,j) to 1.

Figure 5:
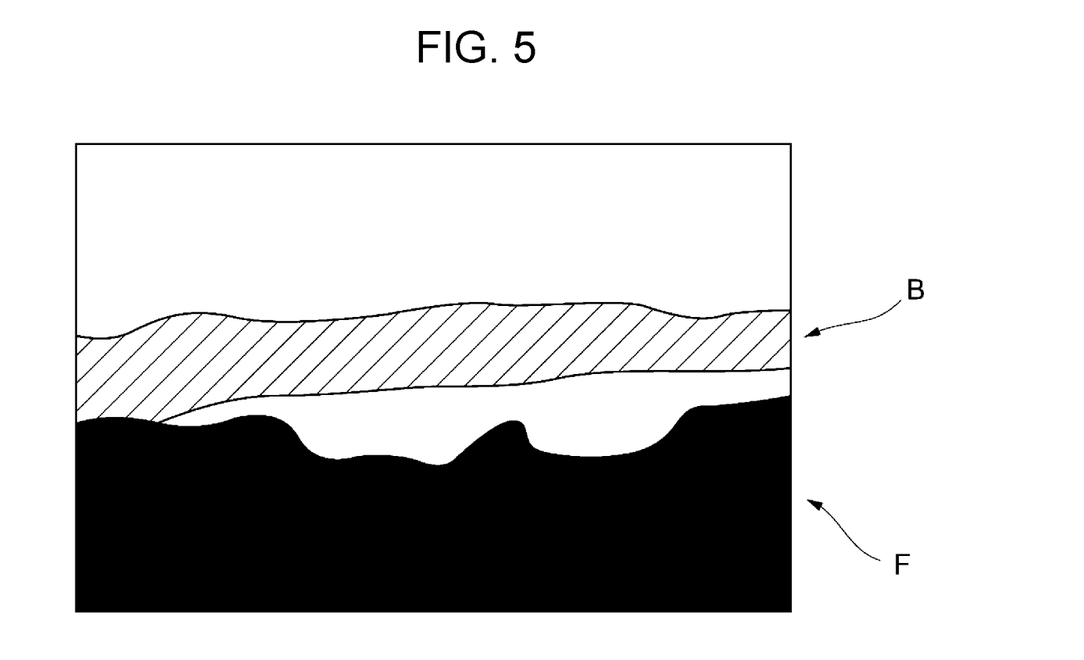
FIG. 5 illustrates a processing target image that has undergone the image processing of the first exemplary embodiment.

FIG. 5 illustrates the image H' image processed in accordance with the first exemplary embodiment.

The image processing of reflecting the impression of the processing target image H in FIG. 2A on the impression of the sample image M in FIG. 2B is performed via the method described above.

As illustrated in FIG. 5, the background image B is identical to the image in FIG. 2C and the foreground F remains the dark area with the luminance not becoming excessively high. As a result, the image-processed image H' is a natural image.

According to the first exemplary embodiment, when the image processing of matching the image quality of the processing target image H to the image quality of the sample image M, the image-processed image H' may be less likely to become unnatural.

In a person's impression of an image, a non-dark area, namely, a brighter area is predominant over a dark area. A feature value with a brighter area emphasized is thus extracted by determining the feature value with the luminance component I used as the weight W. Specifically, the feature value that reflects the non-dark area more is extracted. As in the processing target image H in FIG. 2A having a larger dark area and thus more dark pixels, the mean of the pixel values of the pixels forming the image is less likely to be smaller. The foreground F of the sample image M in FIG. 3B with a dark area and thus dark pixels is less likely to have a higher standard deviation of the pixels. As a result, the image-processed image H' is relatively free from an unnatural image and creation of a defect.

According to equations (4) through (6), the component adjuster 13 performs alpha blending using again the weight W and determines the image information of the image-processed image H'. In the non-dark area having a higher weight W, the feature value of the processing target image H is matched to the feature value of the sample image M. In contrast, in the dark area having a lower weight W, the feature value of the processing target image H does not change in a large amount. As a result, the feature value of the sample image M is reflected more in the dark area and the impression of the processing target image H is likely to become the impression of the sample image M. The dark area is likely to reflect the feature value of the sample image M less and to remain dark. Referring to FIG. 2C, the possibility that the image-processed image H' becomes unnatural may be controlled more.

Second Exemplary Embodiment

A second exemplary embodiment is described below. According to the first exemplary embodiment, the luminance components I of the processing target image H and sample image M directly serve as the weights W. According to the second exemplary embodiment, an operation to calculate the weight W from the luminance component I is performed instead of directly using the luminance component I as the weight W.

Figure 6A:
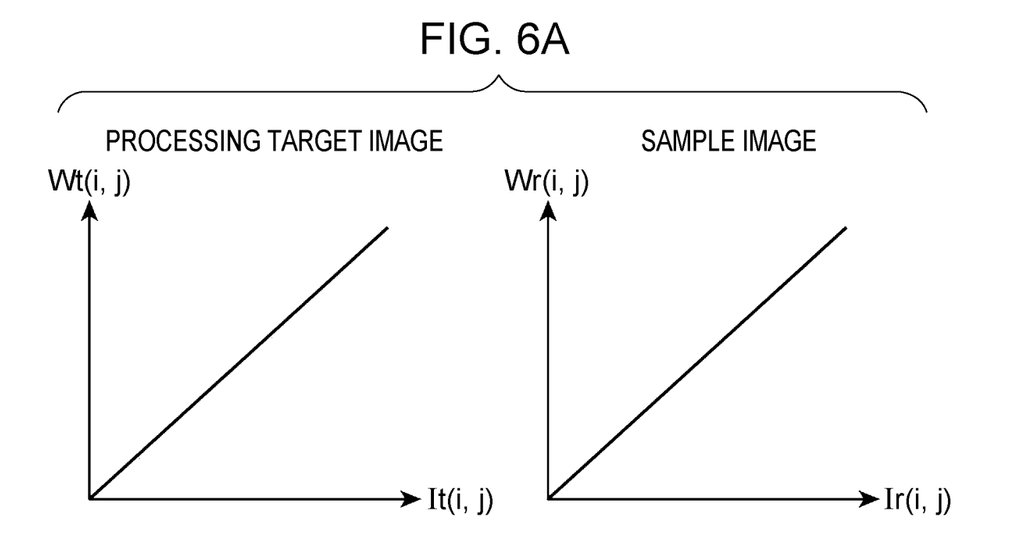
FIGS. 6A and 6B illustrate a relationship between a luminance component and a weight.
Figure 6B:
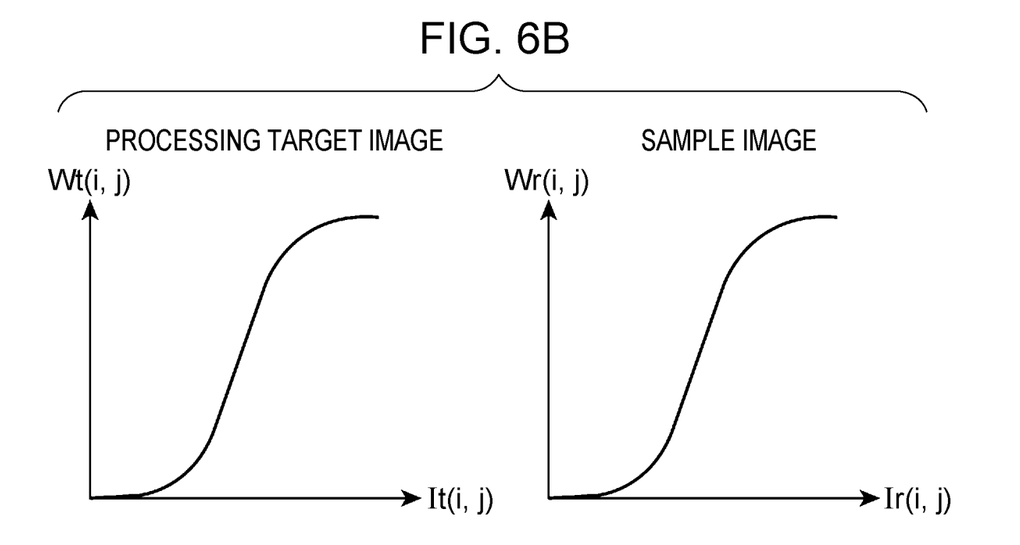

FIGS. 6A and 6B illustrate the relationship between the luminance component I and the weight W. The horizontal axis herein represents the luminance component I and the vertical axis herein represents the weight W. The relationship between the luminance component I and the sample image M is illustrated differently from the processing target image H to the sample image M. In the processing target image H, the horizontal axis represents It(i,j) and the vertical axis represents Wt(i,j). In the sample image M, the horizontal axis represents Ir(i,j) and the vertical axis represents Wr(i,j).

FIG. 6A illustrates the relationship between the luminance component I and the weight W according to the first exemplary embodiment.

According to the first exemplary embodiment, the weight W is the luminance component I and the relationship between the luminance component I and the weight W is proportional. In other words, the relationship between the luminance component I and the weight W is a monotonously increasing function. As the luminance component I increases, the weight W also increases and as the luminance component I decreases, the weight W also decreases.

FIG. 6B illustrates the relationship between the luminance component I and the weight W according to the second exemplary embodiment.

According to the second exemplary embodiment, the relationship between the luminance component I and the weight W is also a monotonously increasing non-linear function as in the first exemplary embodiment.

The function illustrated in FIG. 6B is implemented using a logistic function. If the relationship between the luminance component I and the weight W is expressed using the logistic function, the relationship may be defined by equations (10). In equations (10), k1, k2, k3, and k4 are constants.

$$Wt(i, j) = \frac{1}{1 + e^{-k1(It(i,j)-k2)}} \quad (10)$$

$$Wr(i, j) = \frac{1}{1 + e^{-k3(Ir(i,j)-k4)}}$$

According to the second exemplary embodiment, the image-processed image H' is likely to be a natural image.

Referring to FIGS. 6A and 6B, similar functions are used for Wt(i,j) of the processing target image H and Wr(i,j) of the sample image M. Alternatively, different functions may be used for Wt(i,j) and Wr(i,j).

Third Exemplary Embodiment

A third exemplary embodiment is described below. According to the third exemplary embodiment, scenes of the processing target image H and the sample image M are analyzed and the weight W is modified from scene to scene.

Figure 7:
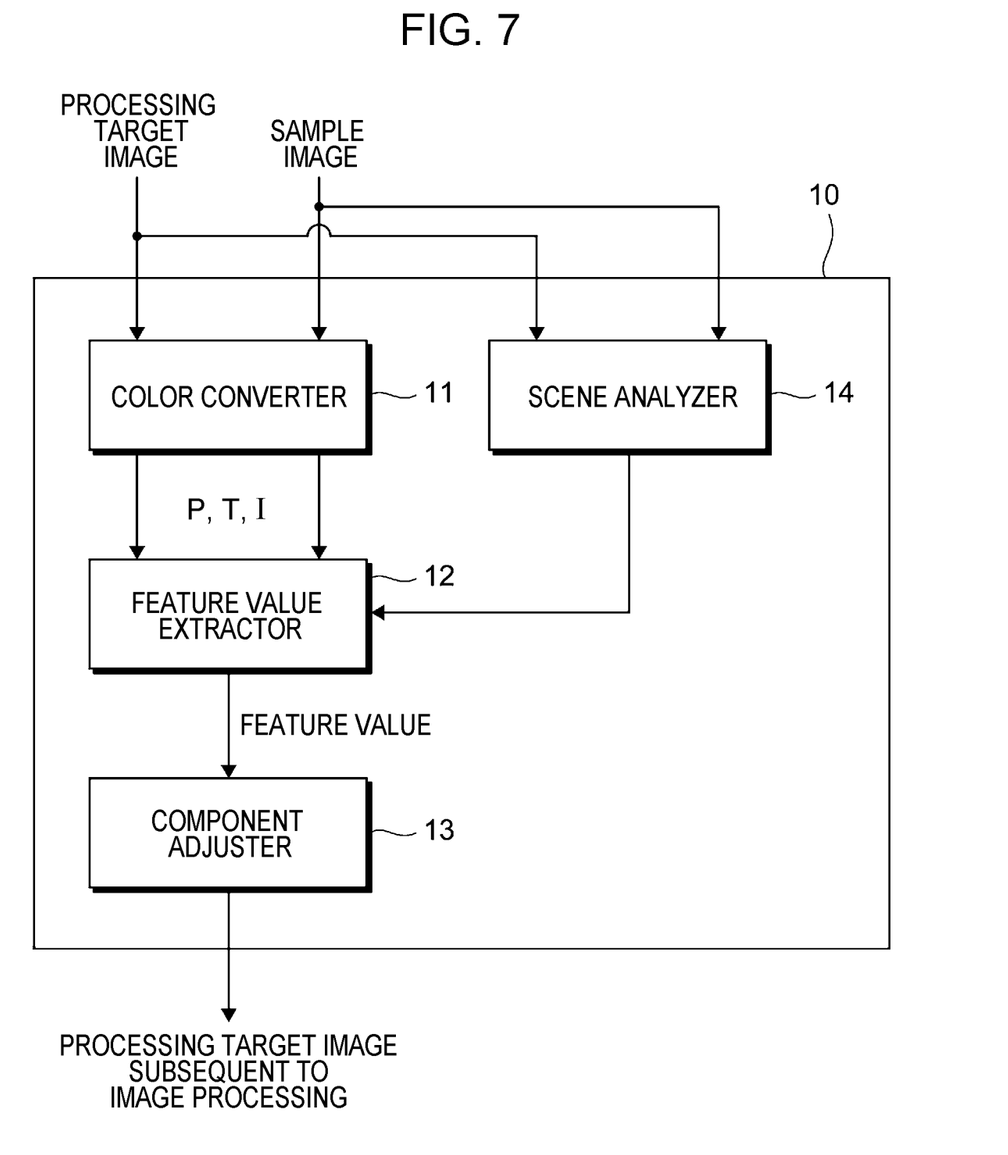
FIG. 7 is a functional block diagram illustrating an image processing apparatus of a third exemplary embodiment.

FIG. 7 is a functional block diagram illustrating the image processing apparatus 10 of the third exemplary embodiment. The image processing apparatus 10 in FIG. 7 is different from the image processing apparatus 10 in FIG. 4 in that the image processing apparatus 10 in FIG. 7 includes a scene analyzer 14. The functions of the color converter 11, feature value extractor 12, and component adjuster 13 remain unchanged. The following discussion focuses on the scene analyzer 14.

The scene analyzer 14 analyzes a scene of the sample image M. Specifically, the scene analyzer 14 determines whether the scene of the sample image M is a night view or not. A determination as to whether the scene of the sample image M is a night view or not is made depending on the ratio of the dark area to the whole sample image M. This determination may be made using deep learning. A determination as to whether an area is dark or not may be made using a threshold. Specifically, if the luminance component I is equal to or below a predetermined threshold, the area is a dark area. If the luminance component I is above the predetermined threshold, the area is a non-dark area.

The feature value extractor 12 modifies the weight W in response to the scene of the sample image M. If the sample image M is a night view, the feature value extractor 12 sets the weight W such that the relationship between the luminance component I and the weight W is a monotonously decreasing function.

Figure 8A:
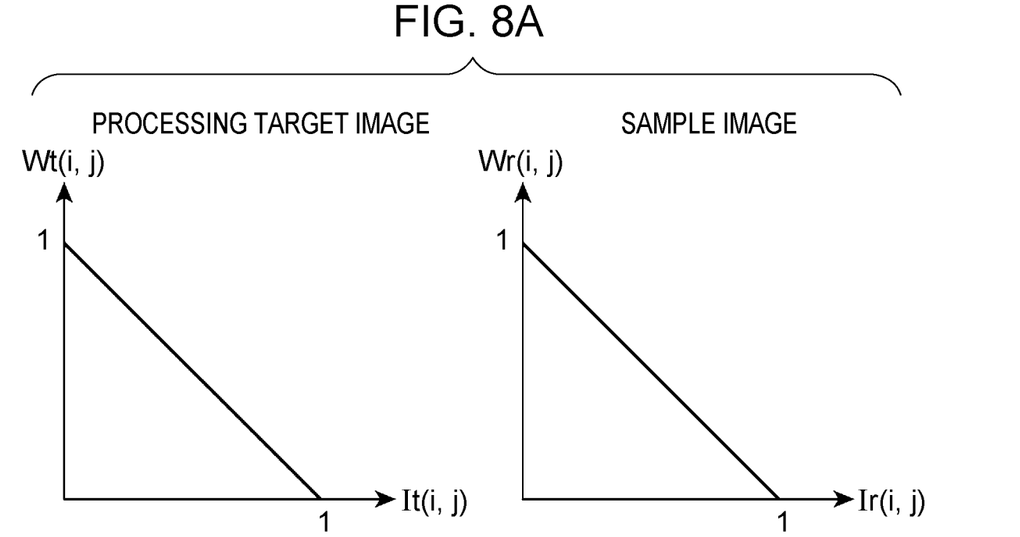
FIGS. 8A and 8B illustrate a case in which a relationship between the luminance component and the weight is a monotonously decreasing function.
Figure 8B:
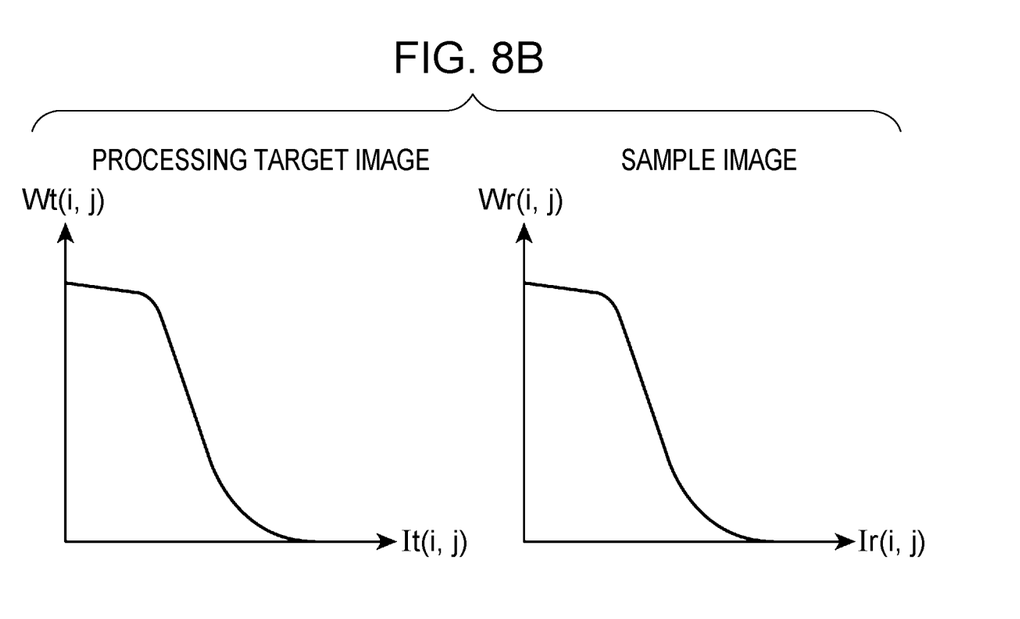

FIGS. 8A and 8B illustrate that the relationship between the luminance component I and the weight W is a monotonously decreasing function. The relationship between the luminance component I and the weight W in FIG. 8A is defined by equations (11).

$$Wt(i,j)=1-It(i,j)$$

$$Wr(i,j)=1-Ir(i,j) \quad (11)$$

If the sample image M is other than a night view, the feature value extractor 12 sets the weight W such that the relationship between the luminance component I and the weight W is a monotonously increasing function. Specifically, the relationship between the luminance component I and the weight W is set as illustrated in FIGS. 6A and 6B.

If the relationship between the luminance component I and the weight W is the monotonously decreasing function, not only the linear function in FIG. 8A but also the non-linear function in FIG. 8B may be used. In the case of the monotonously increasing function, the luminance component I may be raised in a region where the luminance component I is smaller.

According to the third exemplary embodiment, the processing target image H may be image-processed depending on the scene and the possibility that the image-processed image H' becomes unnatural may be controlled even more.

Fourth Exemplary Embodiment

A fourth exemplary embodiment is described below. In the exemplary embodiments described above, the luminance component I is used. Alternatively, any component may be used as long as it is related to luminance. The component related to luminance represents information indicating the brightness of an image and, for example, a lighting component may be used in place of the luminance component I. According to the fourth exemplary embodiment, the lighting component is used in place of the luminance component I.

It is known that in the characteristics of human visual perception, a perceptual amount at a point of the retina (a pixel in an image) on which light is incident affects the mean of ambient luminance of the point. The ambient luminance corresponds to the lighting component estimated. For example, the estimation of the lighting component is made by performing moving average or convolution expressed by Gaussian function of equation (12). In equation (12), k represents a coefficient that is used to normalize to 1 results of integration with filter size in the image processing and σ represents the degree of smoothing (scale). The Gaussian function is an example only. Any filter may be used as long as a similar function (smoothing) results. For example, a bilateral filter known as a smoothing filter to preserve edge in a modified form of equation (12) may be used.

$$G(i, j) = k \, \exp\left(-\frac{i^2 + j^2}{\sigma^2}\right) \quad (12)$$

Using the Gaussian function expressed by equation (12), the weights W of the processing target image H and sample image M based on the lighting component are calculated in accordance with equations (13). The upper equation (13) indicates that Wt(i,j) is calculated through the convolution of G(i,j) and It(i,j). The lower equation (13) indicates that Wr(i,j) is calculated through the convolution of G(i,j) and Ir(i,j).

$$Wt(i,j)=G(i,j)\otimes It(i,j)$$

$$Wr(i,j)=G(i,j)\otimes Ir(i,j) \quad (13)$$

The fourth exemplary embodiment is based on the idea that the lighting component of an image contributes to the impression of the image. The lighting component is used as a component related to luminance and is thus used as the weight W. It is thus predictable that the image processing may be performed in view of the characteristics of human visual perception.

As described with reference to the second exemplary embodiment, the weight W may be determined based on the lighting component. As described with reference to the third exemplary embodiment, the weight W may be determined based on the lighting component with respect to the scene.

Fifth Exemplary Embodiment

A fifth exemplary embodiment is described. According to the fifth exemplary embodiment, the weight W is modified in response to an instruction from the user.

In the exemplary embodiments described above, the feature value extractor 12 determines the weight W in accordance with a predetermined process. Alternatively, the user may modify the weight W. Specifically, the user may adjust the degree of the image processing by correcting the luminance component I or the lighting component related to the luminance. In other words, the degree of how much the impression of the sample image M is reflected on the impression of the processing target image H is thus adjusted.

For example, the user may select the degree of the image processing using one of large, medium, small radio buttons displayed on the display 20. From the radio buttons small to medium to large button, the degree of the image processing increases and the impression of the processing target image H becomes closer to the impression of the sample image M. The user may adjust the image processing by operating a sliding bar on the display 20. Alternatively, the user may directly adjust the weight W instead of adjusting the luminance component I or the lighting component.

According to the fifth exemplary embodiment, an image quality desired by the user may be easily obtained in the image-processed image H'.

Process of Image Processing System

Figure 9:
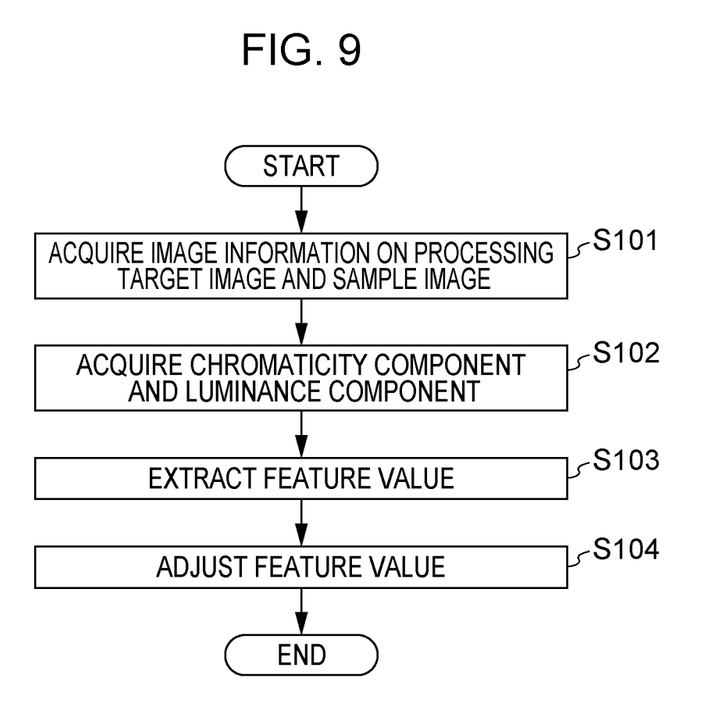
FIG. 9 is a flowchart illustrating a process of the image processing system.

The process of the image processing system 1 is described below. FIG. 9 is a flowchart illustrating the process of the image processing system 1. The color converter 11 acquires the image information on the processing target image H and sample image M (step S101). For example, using the input apparatus 30, the user may select the processing target image H and sample image M from images prepared in advance. The color converter 11 converts the acquired image information and then acquires the chromaticity components P and T and luminance component I (step S102).

The feature value extractor 12 extracts the feature values of the processing target image H and sample image M (step S103). According to the methods described with reference to the first through fourth exemplary embodiments, the feature value extractor 12 extracts the feature values of the images using the weight W based on the luminance component I.

The component adjuster 13 performs the operation to match the feature value of the processing target image H to the feature value of the sample image M (step S104). In this way, the image-processed image H' is created. The image-processed image H' is displayed together with the processing target image H on the display 20.

Program

The process of the image processing apparatus 10 of the exemplary embodiments is implemented by hardware and software resources operating in cooperation with each other. Specifically, the CPU (not illustrated) in the image processing apparatus 10 executes a program that implements the functions of the image processing apparatus 10. The functions of the image processing apparatus 10 are thus implemented.

The process of the image processing apparatus 10 may be construed as a program that causes a computer to perform a function of extracting the component related to luminance in the sample image M and the processing target image H that is to undergo the image processing to match the impression of the processing target image H to the sample image M, a function of extracting the feature values of the processing target image H and sample image M by weighting the pixel value with the weight W based on the component related to luminance with respect to each pixel forming the images, and a function of making adjustment to match the feature value of the processing target image H to the feature value of the sample image M.

In the exemplary embodiments described above, the weight W is used in equations (2) and (3) when the arithmetic mean and the standard deviation are calculated. Alternatively, the weight W may be used when the arithmetic mean or the standard deviation is calculated.

In the exemplary embodiments described above, the mean is the arithmetic mean. Alternatively, the mean may be a geometric mean. In the exemplary embodiments described above, the dispersion is the standard deviation. Alternatively, the dispersion may be one of variety of indexes including root mean square and variance.

In the exemplary embodiments described above, the color converter 11 converts the RGB data into the IPT data. Any chromaticity data in a color space, if separable into a chromaticity component and a luminance component, may be used instead of the IPT data. For example, the RGB data may be converted into CIE L*a*b* data, Lαβ data, CAMO2 data, or HSV data. Appropriate feature value may be obtained using a color space equivalent to a user perceptual amount, such as CIE L*a*b* color space or using color conversion through CIECAM2 or iCAM in view of user's psychological appearance. The impression of the image after being image processed may be likely to be more natural.

In the exemplary embodiments above, the term "processor" refers to hardware in a broad sense. Examples of the processor includes general processors (e.g., CPU: Central Processing Unit), dedicated processors (e.g., GPU: Graphics Processing Unit, ASIC: Application Specific Integrated Circuit, FPGA: Field Programmable Gate Array, and programmable logic device).

In the exemplary embodiments above, the term "processor" is broad enough to encompass one processor or plural processors in collaboration which are located physically apart from each other but may work cooperatively. The order of operations of the processor is not limited to one described in the exemplary embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image processing apparatus comprising
a processor configured to:
 extract a component related to luminance of each of a sample image and a processing target image that is to undergo image processing to match an impression of the processing target image to an impression of the sample image,
 extract a feature value of the processing target image by weighting a pixel value of each pixel forming the processing target image with a weight value responsive to the component related to the luminance in the processing target image,
 extract a feature value of the sample image by weighting a pixel value of each pixel forming the sample image with a weight value responsive to the component related to the luminance in the sample image, and
 make adjustment to match the feature value of the processing target image to the feature value of the sample image.

2. The image processing apparatus according to claim 1, wherein the processor is configured to:
 calculate as the feature value of the processing target image a mean and a dispersion of the pixel value of each pixel forming the processing target image, and calculate as the feature value of the sample image a mean and a dispersion of the pixel value of each pixel forming the sample image.

3. The image processing apparatus according to claim 2, wherein the processor is configured to:
in calculating the feature value of the processing target image:
calculate as the mean a weighted mean that is determined by weighting the pixel value of each pixel forming the processing target image with the weight value responsive to the component related to the luminance in the processing target image, and
calculate as the dispersion a standard deviation that is determined by using the weighted mean after weighting the pixel value of each pixel forming the processing target image with the weight value responsive to the component related to the luminance in the processing target image,
in calculating the feature value of the sample image:
calculate as the mean a weighted mean that is determined by weighting the pixel value of each pixel forming the sample image with the weight value responsive to the component related to the luminance in the sample image, and
calculate as the dispersion a standard deviation that is determined by using the weighted mean after weighting the pixel value of each pixel forming the sample image with the weight value responsive to the component related to the luminance in the sample image.

4. The image processing apparatus according to claim 1, wherein the processor is configured to make adjustment to match the feature value of the processing target image to the feature value of the sample image by performing alpha blending through weighting the pixel value of each pixel forming the processing target image with the weight value responsive to the component related to the luminance in the processing target image.

5. The image processing apparatus according to claim 1, wherein the processor is configured to:
set the weight value responsive to the component related to the luminance in the processing target image such that the weight value has a linearly proportional relationship with the component related to the luminance in the processing target image, and
set the weight value responsive to the component related to the luminance in the sample image such that the weight value has a linearly proportional relationship with the component related to the luminance in the sample image.

6. The image processing apparatus according to claim 1, wherein the processor is configured to:
set the weight value responsive to the component related to the luminance in the processing target image to be the same as a value of the component related to the luminance in the processing target image, and
set the weight value responsive to the component related to the luminance in the sample image to be the same as a value of the component related to the luminance in the sample image.

7. The image processing apparatus according to claim 1, wherein the processor is configured to:
set the weight value responsive to the component related to the luminance in the processing target image such that the weight value has a monotonically increasing non-linear function relationship with the component related to the luminance in the processing target image, and
set the weight value responsive to the component related to the luminance in the sample image such that the weight value has a monotonically increasing non-linear relationship with the component related to the luminance in the sample image.

8. The image processing apparatus according to claim 1, wherein the processor is configured to modify the weight value responsive to the component related to the luminance in the sample image in response to a scene of the sample image.

9. The image processing apparatus according to claim 8, wherein the processor is configured to set the weight value responsive to the component related to the luminance in the sample image, for the sample image being a night view, such that the weight value has a monotonically decreasing relationship with the component related to the luminance in the sample image.

10. The image processing apparatus according to claim 9, wherein the processor is configured to set the weight value responsive to the component related to the luminance in the sample image, for the sample image not being the night view, such that the weight value has a monotonically increasing relationship with the component related to the luminance in the sample image.

11. The image processing apparatus according to claim 1, wherein the processor is configured to correct at least one of the component related to the luminance in the processing target image and the component related to the luminance in the sample image.

12. The image processing apparatus according to claim 11, wherein the processor is configured to adjust a degree of the image processing by correcting at least one of the component related to the luminance in the processing target image and the component related to the luminance in the sample image.

13. An image processing system comprising:
a display; and
an image processing apparatus that performs image processing on a processing target image displayed on the display,
wherein the image processing apparatus includes a processor configured to:
extract a component related to luminance of each of a sample image and a processing target image that is to undergo the image processing to match an impression of the processing target image to an impression of the sample image,
extract a feature value of the processing target image by weighting a pixel value of each pixel forming the processing target image with a weight value responsive to the component related to the luminance in the processing target image,
extract a feature value of the sample image by weighting a pixel value of each pixel forming the sample image with a weight value responsive to the component related to the luminance in the sample image, and
make adjustment to match the feature value of the processing target image to the feature value of the sample image.

14. A non-transitory computer readable medium storing a program causing a computer to execute a process for processing an image,
the process comprising:
extracting a component related to luminance of each of a sample image and a processing target image that is to undergo image processing to match an impression of the processing target image to an impression of the sample image, extracting a feature value of the processing target image by weighting a pixel value of each pixel forming the processing target image with a weight value responsive to the component related to the luminance in the processing target image, extracting a feature value of the sample image by weighting a pixel value of each pixel forming the sample image with a weight value responsive to the component related to the luminance in the sample image, and making adjustment to match the feature value of the processing target image to the feature value of the sample image.

* * * * *